United States Patent [19]

Bui-Hai

[11] Patent Number: 4,507,665

[45] Date of Patent: Mar. 26, 1985

[54] PRIMARY SOURCE WITH FREQUENCY RE-UTILIZATION

[75] Inventor: Nhu Bui-Hai, Paris, France

[73] Assignee: Thomson-CSF, Paris, France

[21] Appl. No.: 386,600

[22] Filed: Jun. 9, 1982

[30] Foreign Application Priority Data

Jun. 11, 1981 [FR] France ............... 81 11481

[51] Int. Cl.³ ............................................. H01Q 13/00
[52] U.S. Cl. .................................. 343/786; 343/756; 333/135
[58] Field of Search ............... 343/786, 756; 333/126, 333/135, 137

[56] References Cited

U.S. PATENT DOCUMENTS

| | | | |
|---|---|---|---|
| 3,560,976 | 2/1971 | Foldes | 343/786 |
| 3,665,481 | 5/1972 | Low | 343/762 |
| 3,696,434 | 9/1972 | Sciambi, Jr. | 343/786 |
| 3,731,236 | 5/1973 | Tullio | 333/126 |
| 4,162,463 | 7/1979 | Tullio | 333/117 |
| 4,233,576 | 11/1980 | Pelchat | 333/16 |

FOREIGN PATENT DOCUMENTS

| | | | |
|---|---|---|---|
| 2525358 | 12/1976 | Fed. Rep. of Germany | 343/786 |
| 2757115 | 6/1979 | Fed. Rep. of Germany | |
| 2442518 | 6/1980 | France | |
| 2455803 | 11/1980 | France | 343/786 |
| 2059170 | 11/1979 | United Kingdom | |
| 2039699 | 8/1980 | United Kingdom | 343/786 |

OTHER PUBLICATIONS

AP-S International, Jun. 21, 1977, Inst. of Electrical and Electronic Engrs. R. W. Gruner, Compact Dual-Polarized Diplexers for 4/6 GHz Earth Station Applications, pp. 341-344.

*Primary Examiner*—Eli Lieberman
*Assistant Examiner*—K. Ohralik
*Attorney, Agent, or Firm*—Oblon, Fisher, Spivak, McClelland & Maier

[57] ABSTRACT

A primary source for a space communications antenna requiring a mode extractor means comprises more especially a horn with two types of evenly spaced alternate corrugations whose depth decreases, for each of the types, from the neck to the opening, followed by a band separator of the quasi-optical filter type, followed by a mode extractor means placed in series in the reception channel of the primary source.

4 Claims, 6 Drawing Figures

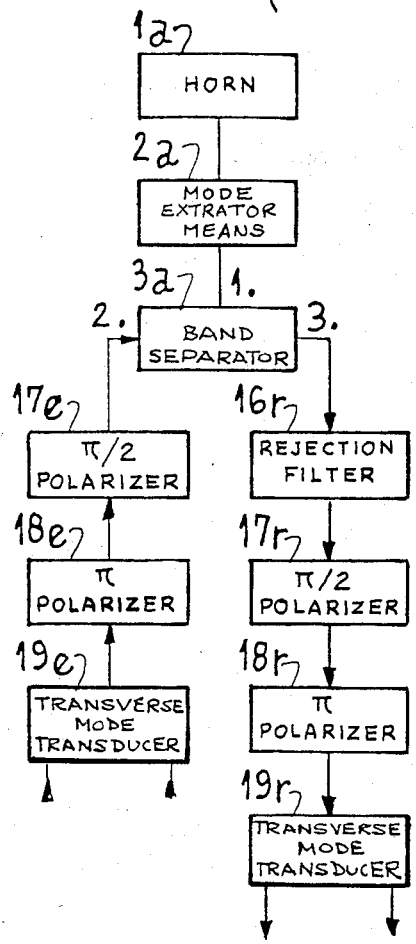
FIG_1 (PRIOR ART)
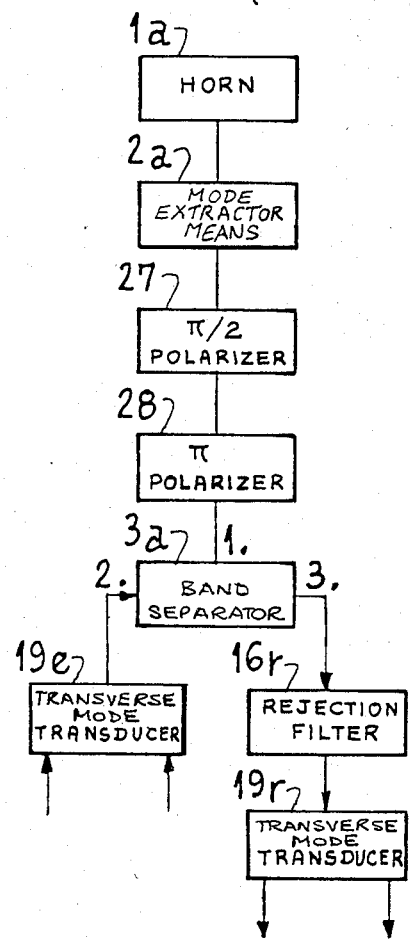
FIG_2 (PRIOR ART)

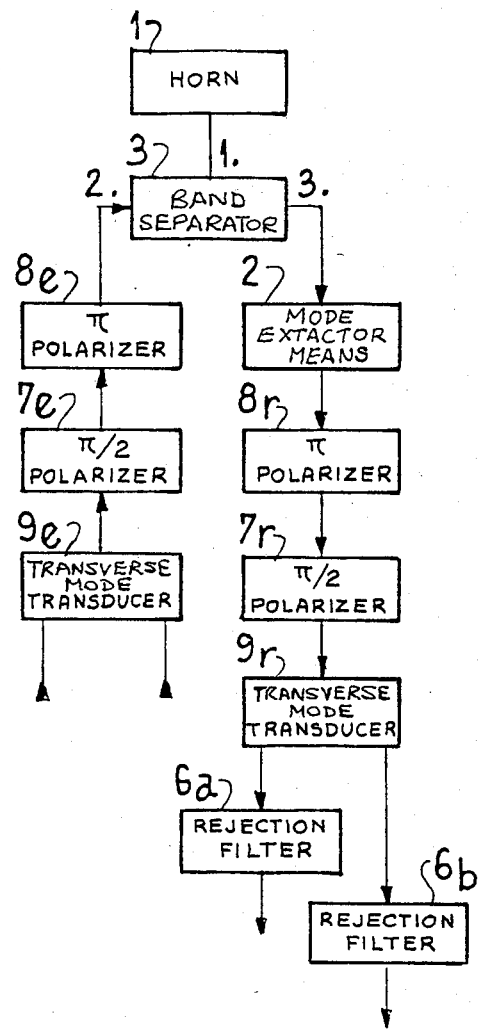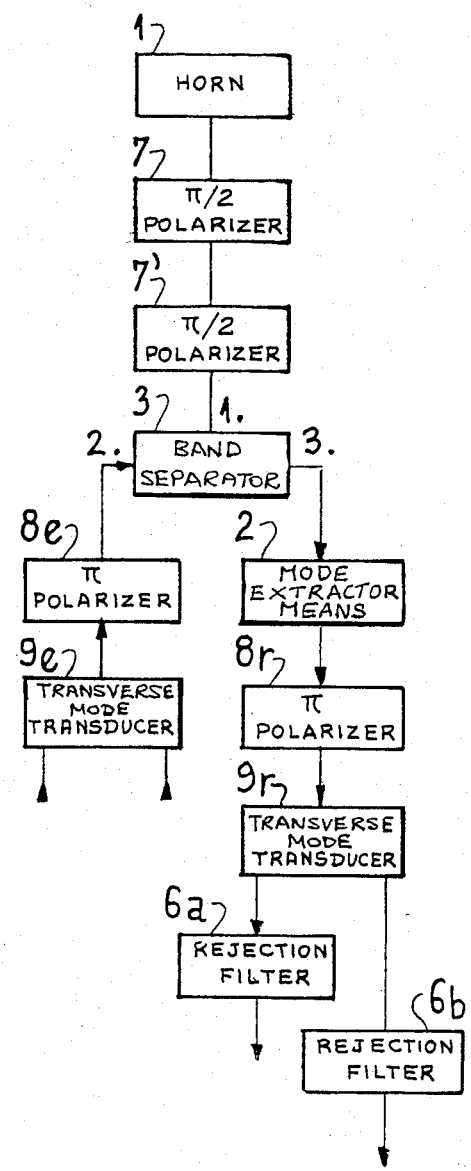

FIG_5
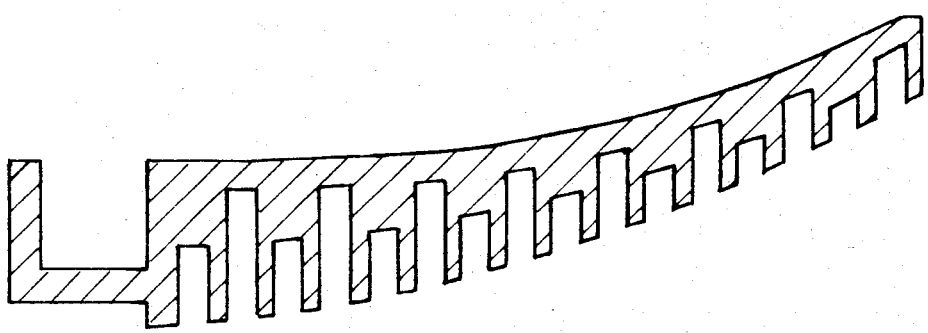
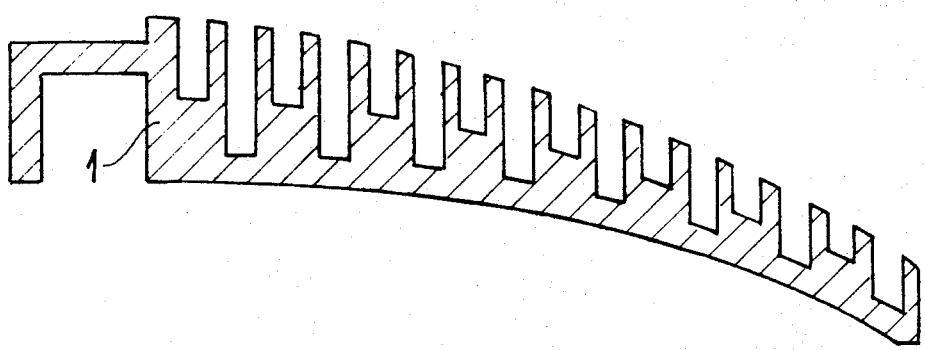
FIG_6
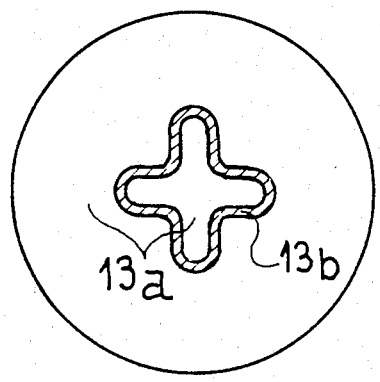

PRIMARY SOURCE WITH FREQUENCY RE-UTILIZATION

BACKGROUND OF THE INVENTION

The present invention relates to a very wide band primary source for a space communications antenna and more exactly for the antenna of a ground-based station operating with frequency re-utilization, that is to say utilization of the same frequency band in two orthogonal polarizations.

Space communications use at the present time two groups of frequency bands. In the first group, the up-going connection, called "emission" hereafter, takes place between 5.925 and 6.425 GHz and the down-coming connection, called "reception" hereafter, takes place between 3.7 and 4.2 GHz. In the second group, the up-going connection, or "emission", takes place between 14 and 14.5 GHz and the downcoming connection or "reception" between 10.95 and 11.7 GHz.

Recently, widening the frequency bands has been contemplated so as to increase the transmission capacity; now, these new bands are considerably wider since the band for emission goes from 5.85 to 7.075 GHz and the band for "reception" from 3.4 to 4.2 GHz and from 4.5 to 4.8 GHz.

Known primary sources, two examples of which will be given further on, do not allow these bands to pass, all the more so since the desired performances are greater than or at least equal to those obtained with the existing primary sources with frequency re-utilization.

The object of the present invention is to provide a primary source requiring a mode extractor means and capable of operating in the new frequency bands mentioned above.

SUMMARY OF THE INVENTION

This primary source, in accordance with the invention is obtained, in particular, by disposing the mode extractor means in the reception channel only.

The invention provides a primary source with frequency re-utilization which comprises the following combination of elements, allowing it to operate in a very wide band, a horn having a neck, an opening and two types of evenly spaced apart alternating corrugations whose depth decrease, for each of the two types, from the neck to the opening, a band separator of the quasi-optical filter type having a first access coupled to the horn and a second and third accesses, a mode extractor means having an input coupled to the third access of the junction and an output, a first and second transverse mode transducer each having a first, a second and a third access and which are coupled respectively by their first access to the second access of the junction and to the output of the mode extractor means, two rejection filters coupled respectively to the second and third accesses of the second transducer, and a first "$\pi/2$" polarizing device coupled in series between the horn and the first transducer and a second "$\pi/2$" polarizing device coupled in series between the horn and the second transducer.

BRIEF DESCRIPTION OF THE DRAWINGS

The invention will be better understood and other features will appear from the following description and the accompanying figures which show:

FIGS. 1 and 2: primary sources of the prior art;
FIGS. 3 and 4: primary sources of the invention, and
FIGS. 5 and 6: detail views of some elements of FIGS. 3 and 4.

In the different figures, similar elements bear the same references.

DESCRIPTION OF THE PREFERRED EMBODIMENT

The main forms of known constructions of primary sources with frequency re-utilization, using a mode extractor means, may be classed in two categories which are differentiated from each other by the use or not of polarizers covering both the 3.7–4.2 GHz and 5.925–6.425 GHz bands and which will be called hereafter wide band polarizers as opposed to polarizers covering narrow bands, for instance 3.7–4.2 GHz, 5.925–6.425 GHz, 3.4–4.8 GHz, 5.8–7.075 GHz.

FIG. 1 relates to a primary source which does not use a wide band polarizer. In this source, the polarizers are separate: one for the "reception" 3.7–4.2 GHz band and one for the "emission" 5.925–6.425 GHz band.

FIG. 1 shows a horn 1a coupled, through a mode extractor means, to the first access of a band separator. From the second and third accesses of the band separator 3a extend two channels: an emission channel and a reception channel.

Horn 1a is a conventional corrugated horn; it covers the two 3.7–4.2 and 5.925–6.425 GHz bands.

The role of the mode extractor means 2a is to extract the signals of the modes specific to the tracking and which are in the 3.7–4.2 GHz "reception" band. Since it also receives the signals from the "emission" band to transmit them to the horn, it must also allow the 5.925–6.425 GHz "emission" band to pass. It is then a very important element which must perform well. It is consequently difficult to construct because of its wide pass-band:
3.7–4.2 GHz and 5.925–6.425 GHz, i.e. Fmax/Fmin: (6.425/3.7)=1.736.

The role of the band separator 3a is to group together reception and emission so as to have only a single horn; it is constructed in different ways, generally from directive filters or couplers.

The emission channel comprises, in series with the third access of band separator 3a and the two "reception" accesses of the primary source: a rejection filter 16r, a $\pi/2$ polarizer 17r, a $\pi$ polarizer 18r, and a transverse mode transducer 19r whose horizontal and vertical polarization accesses form the two "reception" accesses of the primary source.

The rejection filter 16r stops the emission band (5.925–6.425 GHz) and only lets the reception band (3.7–4.2 GHz) pass through.

Polarizer 17r only covers the 3.7–4.2 GHz band or Fmax/Fmin: 4.2/3.7=1.135; it is a $\pi/2$ type polarizer for transforming the circular polarization field from the horn into a rectilinear polarization field.

Polarizer 18r, of the "$(\pi/2)+(\pi/2)=\pi$" type, compensates depolarization electro-mechanically when the station in which the primary source is located is equipped with a system for detecting this depolarization; it does not then always exist in known installations.

The band separator transducer 19r separates the two orthogonal linear polarizations from the wave coming from polarizers 17r, 18r.

The emission channel comprises, in series between the two "emission" accesses of the primary source and the second access of junction 3a: a band separator transducer 19e whose horizontal and vertical polarization acesses form the two "emission" accesses of the primary source, a $\pi$ polarizer 18e and a $\pi/2$ polarizer 17e.

In the emission channel, the band separator transducer 19e mixes the two orthogonal linear polarizations of the waves applied to its two polarization accesses; polarizer 18e, of the "$(\pi/2)+(\pi/2)=\pi$" type, has the same role as polarizer 18r in the reception channel; as for polarizer 17e, which is a $\pi/2$ type polarizer, it only covers the 5.925–6.425 GHz band where Fmax/Fmin=1.0843.

FIG. 2 relates to a known primary source using a wide band polarizer, common to the emission and reception channels and covering then the 3.7–4.2 GHz and 5.925–6.425 GHz bands.

FIG. 2 shows a horn 1a coupled, through a higher mode coupler 2a, followed by a wide band polarizer 27, of the $\pi/2$ type, itself followed by a polarizer 28, of the "$\pi/2)+(\pi/2)=\pi$" type, to the first access of a band separator 3a. From the second and third accesses of the band separator 3a extend two channels: an emission channel and a reception channel.

Horn 1a and the higher mode coupler 2a of FIG. 2 are respectively identical with those of FIG. 1.

The wide band polarizer, as was mentioned above, covers the 3.7–4.2 GHz and 5.925–6.425 GHz bands, i.e. Fmax/Fmin=(6.425/3.7)=1.736); it is an element difficult to construct and so very costly.

The $\pi$ type polarizer 28 plays the same role as polarizers 18r, 18e of FIG. 1 but is much more difficult to construct because of its wider operating frequency band.

The band separator 3a has the same role as band separator 3a in FIG. 1.

The reception channel of the primary source according to FIG. 2 comprises in series: a rejection filter 16r and a transverse mode transducer 19r identical, in so far as their construction and role are concerned, to filter 16r and transducer 19r of FIG. 1. Similarly, the emission channel of the primary source of FIG. 2 comprises an transverse mode transducer 19e, identical to the transducer 19e of FIG. 1.

FIGS. 3 and 4 concern two primary sources intended for operation at frequencies going from 3.4 to 7.075 GHz, i.e. corresponding to more than an octave: (7.075/3.4)=2.08.

FIG. 3 shows a horn 1 to which is connected the first access of a band separator 3. From the second and third accesses of junction 3 extend two channels: an emission channel and a reception channel.

Horn 1 is a horn having two types of evenly spaced alternating corrugations whose depth decreases, for each of the types, from the neck of the horn to its opening. Such horns are known; they allow operation in a frequency band greater than an octave. FIG. 5 shows, in a longitudinal sectional view, how horn 1 of FIGS. 3 and 4 is formed; this horn has an opening diameter of 1000 mm and a length of the corrugated part of 3000 mm; in FIG. 5 the proportions have not been respected so as to better show the variation in depth of the corrugations.

The band separator 3 comprises a first circular waveguide, one end of which is coupled to horn 1 and whose other end forms the access for the reception channel; this first circular guide has four lateral slits disposed at the same level and offset by 90° with respect to each other; rectangular guides connected together these four slits in opposed pairs, through two magic Ts, to the opposite pairs of four lateral slits of a second circular guide, this second circular guide, whose lateral slits are disposed as in the first guide, is short-circuited at one of its ends and has its other end forming the access for the emission channel. Inside the first circular guide of band separator 3, between the lateral slits and the access for the reception channel, is located a set of quasi-optical filters, each of these filters is, as shown in FIG. 6, formed from a crossed metal dipole 13b deposited on a dielectric support 13a, formed from a beryllium oxide sheet, integral with the wall of the cylindrical guide; this sheet is perpendicular to the longitudinal axis of the circular guide.

FIG. 3 shows that the reception channel comprises, between the third access of junction 3 and the two reception accesses of the primary source: a mode extractor means 2, a $\pi$ type polarizer 8r, a $\pi/2$ type polarizer 7r, a transverse mode transducer 9r, whose polarization accesses are coupled respectively to the two reception accesses of the primary source through two rejection filters 6a and 6b. The emission channel, as far as it is concerned, comprises, in series from the two emission accesses of the primary source, a transverse mode transducer 9e, a $\pi/2$ type polarizer 7e and a $\pi$ type polarizer 8e coupled to the second access of the band separator 3.

It should be noted in FIG. 3 that the mode extractor means 2, contrary to the mode extractor means 2a of FIGS. 1 and 2, is situated solely in the reception channel; it has then only the 3.4–4.8 GHz (Fmax/Fmin=1.41) band to cover which is a much narrower band than that of the other known versions. It has the further advantage that it does not have passing therethrough the power of the emission band. For this reason its design is simpler and its cost less for improved performances.

The reception polarizers 8r, 7r of FIG. 3 have to cover a narrower band than the reception polarizers of FIGS. 1 and 2; their design is then also simpler and their cost less for improved performances.

The reception 9r emission 9e transverse mode transducers are not changed with respect to the other existing known versions (FIGS. 1 and 2).

As for the emission polarizers 7e, 8e, the band which they have to cover is limited to the emission band (Fmax/Fmin=(7.075/5.85)=1.21) and is then much narrower than that of the polarizers of the above-mentioned wide band version (FIG. 2). They are then also simpler and of lower cost for improved performances, i.e. smaller losses and a better ellipticity ratio.

FIG. 4 shows another embodiment of a primary source in accordance with the invention. This embodiment only differs from that of FIG. 3 because the $\pi/2$ type polarizers are not placed in the emission and reception channels but in the common part, namely between horn 1 and the band separator 3. It should further be noted that, for ease of construction, two $\pi/2$ type polarizers have been used: one polarizer 7 for the 4–7.075 GHz band and one polarizer 7' for the 3.4–4 GHz band. This embodiment has the advantage, with respect to that of FIG. 3, of reducing the distance between the quasi-optical filter and the band separator 3 (or band separator, and the rejection filters 6a,6b; this avoids the resonances which might be due to the "emission" signals which might have passed through the quasi-optical filter of the band separator 3 in the direction of the "reception" channel.

The invention is not limited to the examples described with reference to FIGS. 3 to 6, and may be applied to other frequency bands.

What is claimed is:

1. A primary source with frequency re-utilization operating in a very wide band, comprising:
    a horn having a neck, an opening and two types of evenly spaces alternate corrugations whose depth decreases, for each of the types, from the neck towards the opening,
    a band separator of the quasi-optical filter type having a first access coupled to the horn and a second and third accesses,
    a mode extractor means having an input coupled to the third access of the band separator and an output,
    a first and second transverse mode transducer each having a first, a second and a third access and which are respectively coupled, by their first access, to the second access of the band separator and to the output of the mode extractor means,
    two rejection filters coupled respectively to the second and third accesses of the second transducer,
    and a first "$\pi/2$" polarizing device coupled in series between the horn and the first transducer and a second "$\pi/2$" polarizing device coupled in series between the horn and the second transducer.

2. The primary source as claimed in claim 1, wherein said first "$\pi/2$" polarizing device is coupled in series between the band separator and the first transverse mode transducer and wherein said second "$\pi/2$" polarizing device is coupled in series between the mode extractor means and the second transverse mode transducer.

3. The primary source as claimed in claim 1, wherein said first and second "$\pi/2$" polarizing devices are coupled in series between the horn and the band separator.

4. The primary source as claimed in any one of claims 1, 2 or 3, wherein a first "$\pi$" polarizing device is coupld in series between the band separator and the first transverse mode transducer and wherein a second "$\pi$" polarizing device is coupled in series between the band separator and said second transverse mode transducer.

* * * * *